(12) United States Patent
Peterson

(10) Patent No.: US 7,665,789 B2
(45) Date of Patent: Feb. 23, 2010

(54) STORAGE RECEPTACLE

(75) Inventor: Michael Peterson, Marysville, OH (US)

(73) Assignee: Honda Motor Company, Ltd, Tokyo (JP)

( * ) Notice: Subject to any disclaimer, the term of this patent is extended or adjusted under 35 U.S.C. 154(b) by 264 days.

(21) Appl. No.: 11/776,764

(22) Filed: Jul. 12, 2007

(65) Prior Publication Data

US 2009/0014970 A1 Jan. 15, 2009

(51) Int. Cl.
B60R 11/06 (2006.01)
(52) U.S. Cl. .................... 296/37.15; 224/400; 224/413
(58) Field of Classification Search .............. 296/37.15; 224/400, 413
See application file for complete search history.

(56) References Cited

U.S. PATENT DOCUMENTS 4,915,188 A 4/1990 Ota et al.
6,419,313 B1 * 7/2002 Newman ................. 297/188.1
2002/0189877 A1 12/2002 Yagisawa et al.
2004/0238253 A1 12/2004 Yonehana et al.
2005/0110265 A1 5/2005 Miyakozawa et al.
2005/0134071 A1 6/2005 Yamashita et al.

FOREIGN PATENT DOCUMENTS

JP 5185973 7/1993

* cited by examiner

Primary Examiner—Lori L Lyjak
(74) Attorney, Agent, or Firm—Ulmer & Berne LLP

(57) ABSTRACT

A seat for a vehicle includes a cushion, a base and a tab. The base supports the cushion and defines a chamber having an opening. The chamber is configured to provide a storage location for a manual and the opening is configured to accommodate passage of a manual to and from the chamber. The tab is provided adjacent to the opening and is moveable between a first position in which the tab blocks a manual from passing through the opening, and a second position in which the tab allows a manual to pass through the opening. A receptacle facilitates storage of a manual beneath the seat of a vehicle. A vehicle includes a seat, a chamber and a tab.

23 Claims, 10 Drawing Sheets

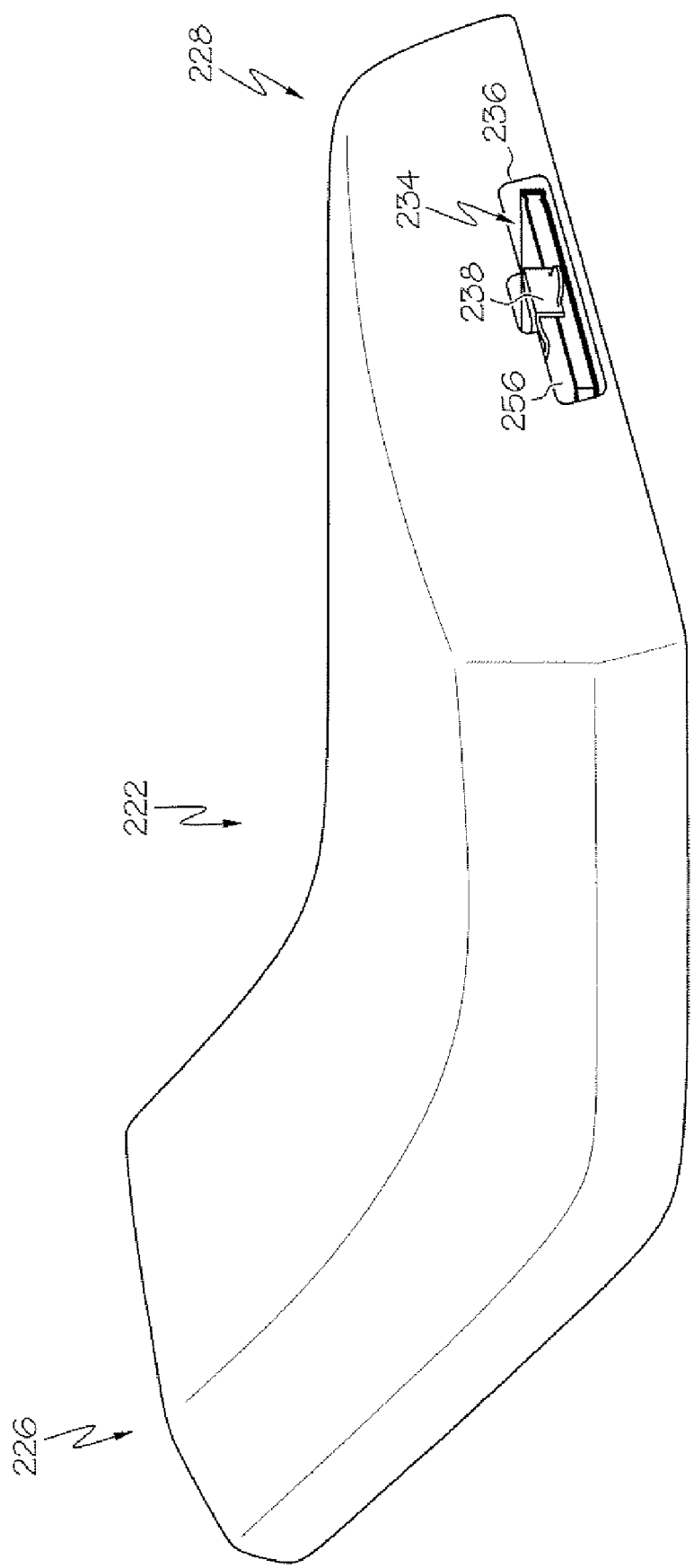

STORAGE RECEPTACLE

TECHNICAL FIELD

The present invention relates to an arrangement for providing a storage location for a manual upon a vehicle.

BACKGROUND OF THE INVENTION

An owner's manual for a vehicle can include important information relating to the operation, maintenance, and safety of the vehicle. Vehicles are often equipped with a specific storage location for an owner's manual. By providing or designating a specific storage location for an owner's manual, it is likely that the owner's manual will not be misplaced by an operator. As such, the owner's manual will be available to all operator of the vehicle at a time of need. For example, a glove compartment has conventionally served this purpose for storage of an automobile's owner's manual.

However, storage of an owner's manual on other vehicles, such as motorcycles and all terrain vehicles (ATVs), has proven to be challenging. For example, in one conventional configuration, a rubber band is used to secure an owner's manual beneath the seat of a vehicle (e.g., an ATV). However, the rubber band may not be sufficiently durable to withstand prolonged use, and/or may not provide a sufficiently strong or reliable securement for the owner's manual. In another conventional configuration, a seat of a vehicle (e.g., an ATV) can include fixed ribs or tabs for retaining an owner's manual. However, in either of these conventional configurations, movement of the owner's manual into and out from the storage location can be difficult and can result in damage (e.g., excessive bending or wear) to an owner's manual over time.

SUMMARY OF THE INVENTION

In accordance with one embodiment of the present invention, a seat for a vehicle comprises a cushion, a base and a tab. The base supports the cushion and defines a chamber having an opening. The chamber is configured to provide a storage location for a manual and the opening is configured to accommodate passage of a manual to and from the chamber. The tab is provided adjacent to the opening and is moveable between a first position in which the tab blocks a manual from passing through the opening, and a second position in which the tab allows a manual to pass through the opening.

In accordance with another embodiment of the present invention, a receptacle is configured to facilitate storage of a manual beneath the seat of a vehicle. The receptacle comprises a frame and a tab. The frame is attached to a vehicle and at least partially defines a chamber having an opening. The chamber is configured to provide a storage location for a manual and the opening is configured to accommodate passage of a manual to and from the chamber. The tab is provided adjacent to the opening and is moveable between a first position in which the tab blocks a manual from passing through the opening, and a second position in which the tab allows a manual to pass through the opening.

In accordance with yet another embodiment of the present invention, a vehicle comprises a seat, a chamber and a tab. The seat comprises a base and a cushion attached to the base. The seat is configured to support at least one of an operator and a passenger of the vehicle in use of the vehicle. The chamber is associated with the seat and is configured to provide a storage location for a manual. The chamber has an opening configured to accommodate passage of a manual to and from the chamber. The tab is provided adjacent to the opening and is moveable between a first position in which the tab blocks a manual from passing through the opening, and a second position in which the tab allows a manual to pass through the opening.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 10 is a rear perspective view depicting a seat in accordance with another embodiment of the present invention.

DETAILED DESCRIPTION OF EMBODIMENTS

Figure 1:
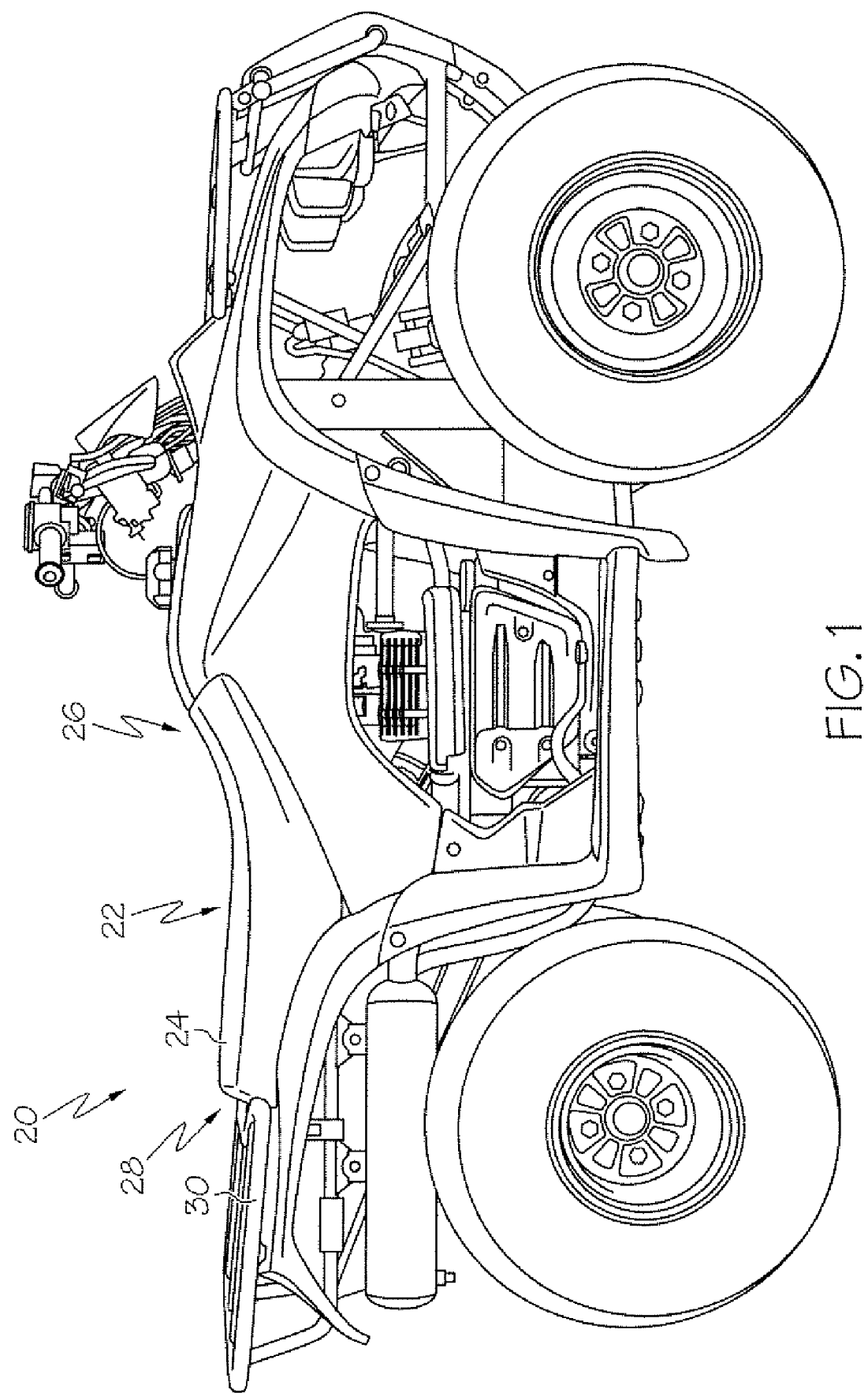
FIG. 1 is a side view depicting an all terrain vehicle (ATV) having a seat in accordance with one embodiment of the present invention.
Figure 2:
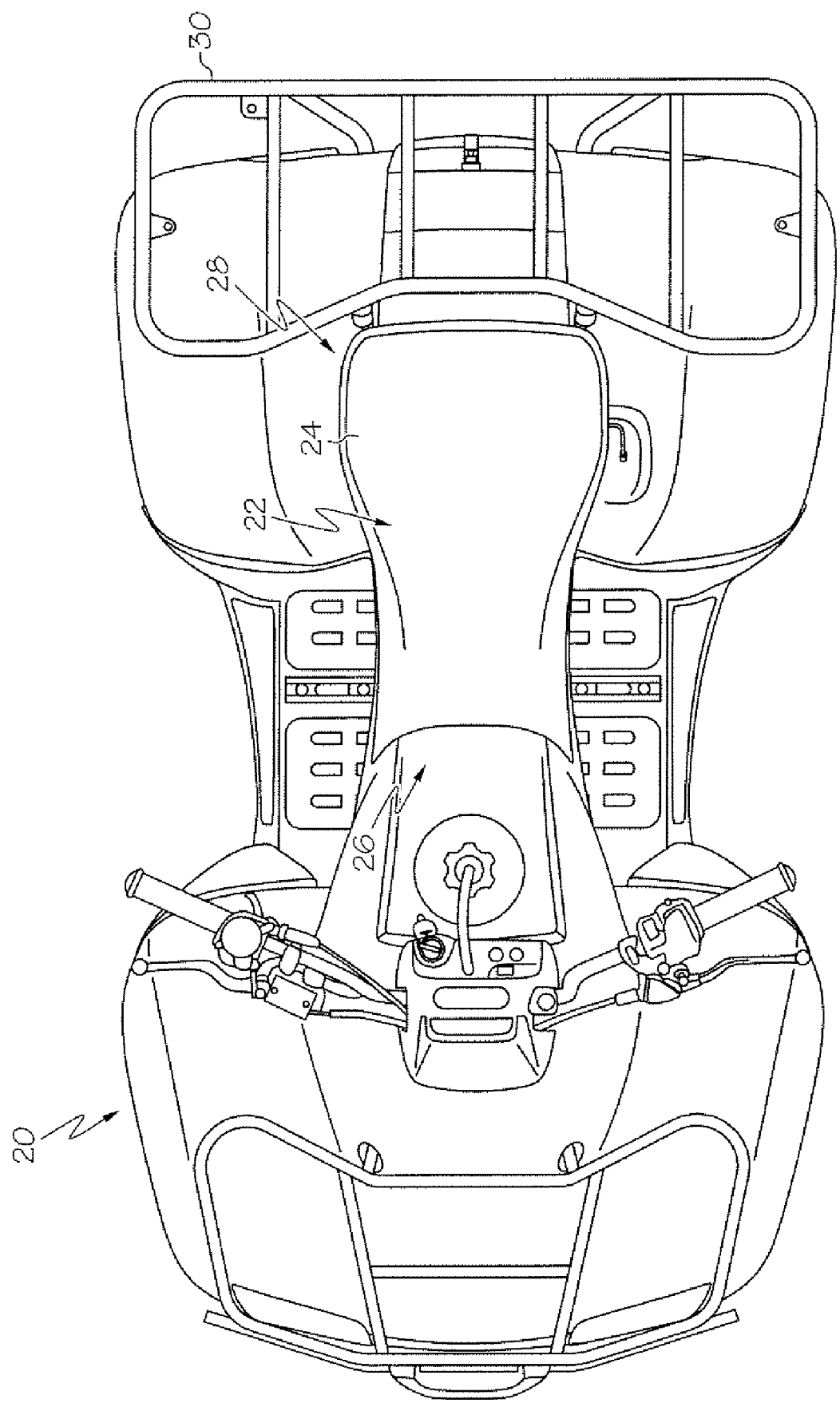
FIG. 2 is a top view depicting the ATV of FIG. 1.

The present invention and its operation is hereinafter described in detail in connection with the views of FIGS. 1-10, wherein like numbers indicate the same or corresponding elements throughout the views. FIGS. 1-2 depict an ATV 20 having a seat 22 for supporting an operator of the ATV 20. The seat 22 is shown to have a cushion 24 which extends from a front end 26 of the seat 22 to a rear end 28 of the seat 22. A cargo rack 30 is shown to be disposed near the rear end 28 of the seat 22.

Figure 3:
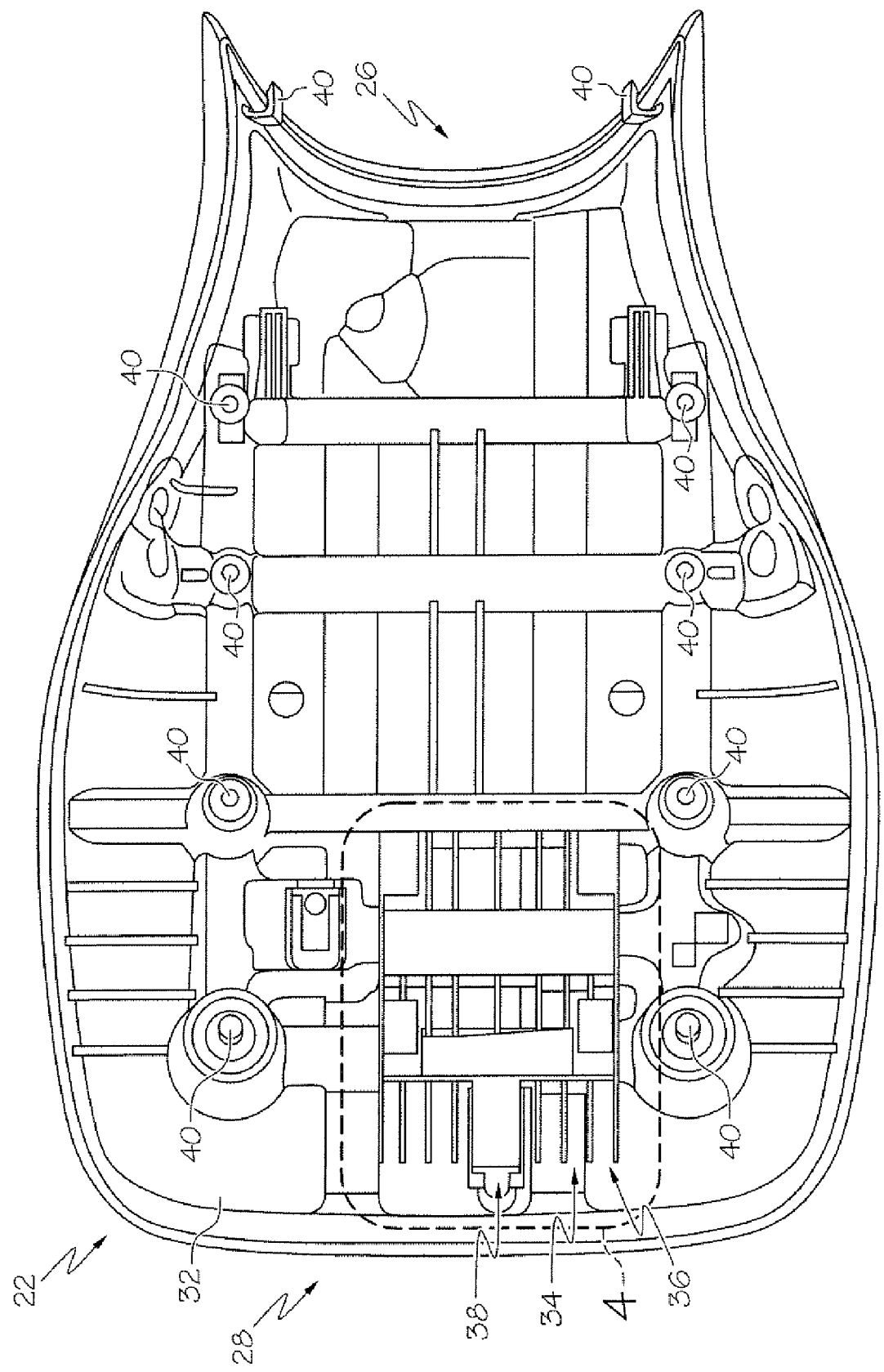
FIG. 3 is a bottom plan view depicting the seat having been removed from the ATV of FIGS. 1-2.
Figure 4:
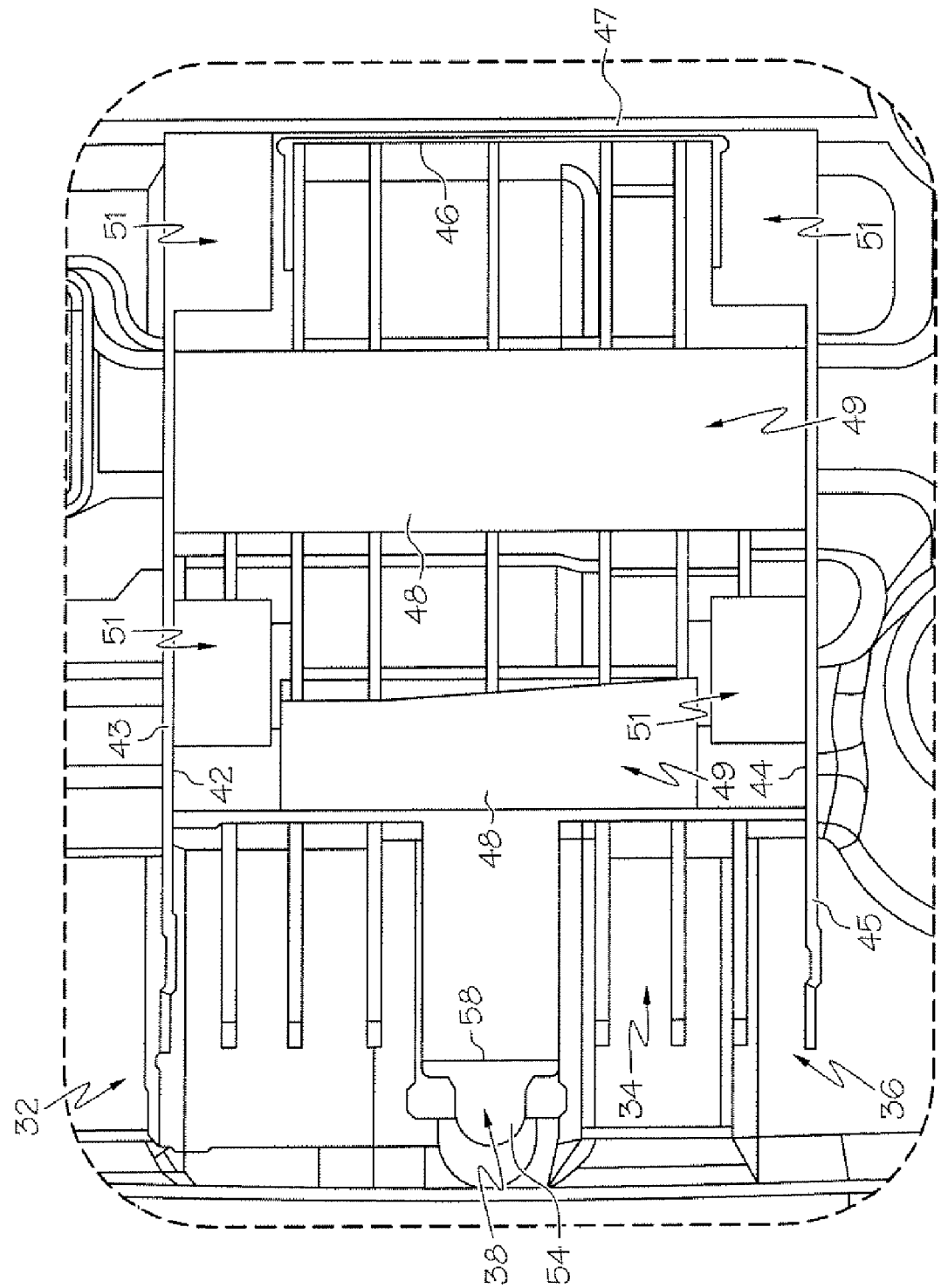
FIG. 4 is an enlarged bottom plan view depicting a portion of the seat of FIG. 3.
Figure 5:
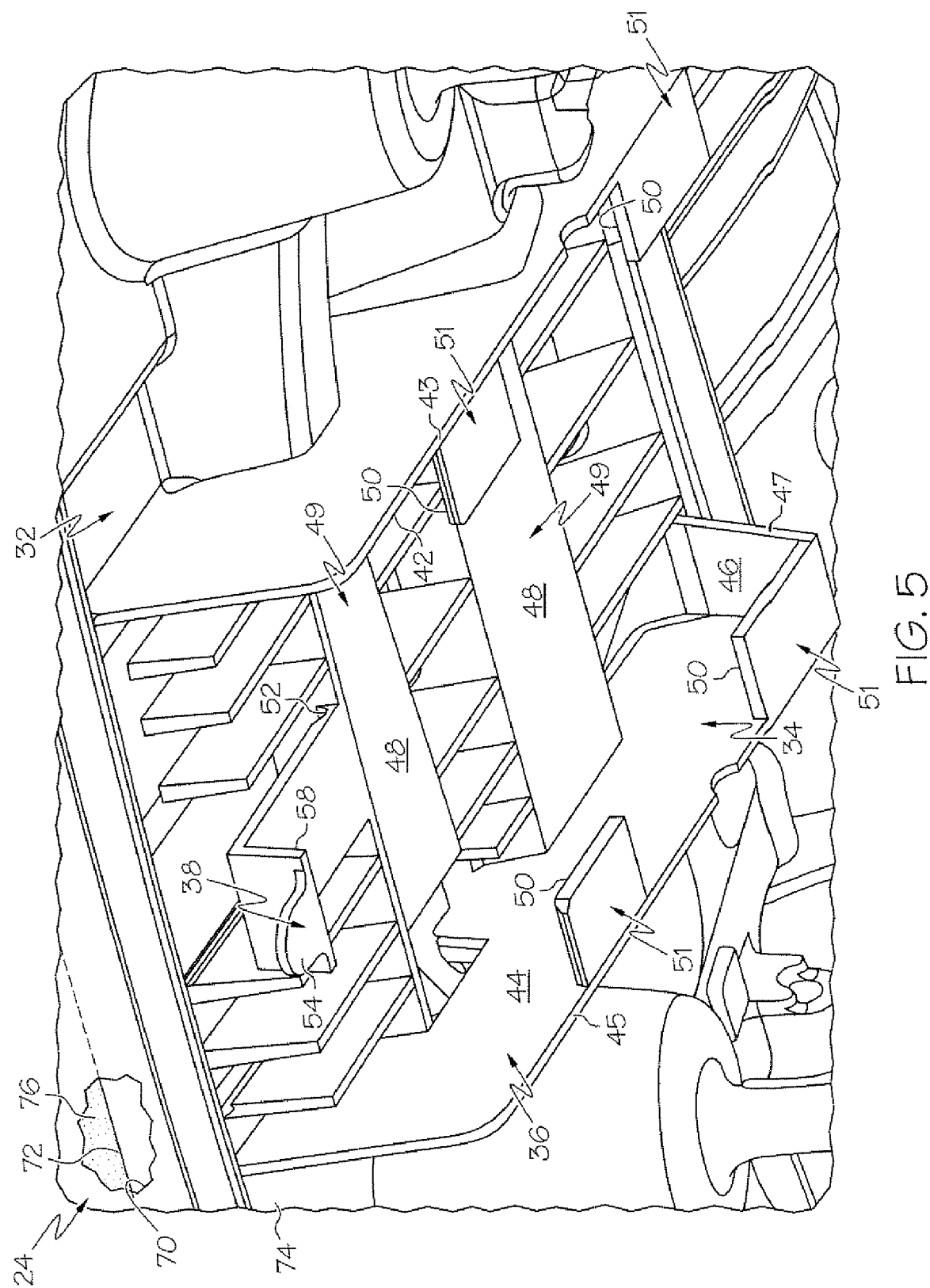
FIG. 5 is an enlarged perspective view depicting a portion of the seat depicted in FIG. 4.

A bottom plan view of the seat 22 is depicted in FIGS. 3-5 wherein the seat 22 has been removed from the ATV 20 for clarity. The seat 22 is shown to have a base 32 which supports the cushion 24. The base 32 can be formed from any of a variety of suitable materials. However, in one particular embodiment, the base 32 can be injection molded from plastic. As shown in FIG. 5 (where a portion of the seat's cover 70 has been removed for clarity), the base 32 comprises a top side 72 and an underside 74, and the cushion 24 is shown to be disposed adjacent to the top side 72 and a chamber 34 (discussed below) can be at least partially defined by the underside 74 and/or provided adjacent to the underside 74. The materials forming the cushion 24 can be selected to provide comfort to an operator sitting upon the seat 22, but can also be durable and weather-resistant. The cushion 24 can include a foam portion (e.g., 76) which is held against the base 32 by wrapping a vinyl, leather, or fabric cover (e.g., 70) over the foam portion and around at least part of the base 32. However, the cushion 24 can alternatively be formed from any variety of alternate materials, and can be associated with the base 32 in any of a variety of specific manners.

The base 32 can include multiple mounting structures (e.g., 40) which are configured to facilitate attachment of the seat 22 to the ATV 20. In one embodiment, the seat 22 can be fixedly and immovably mounted to the ATV 20. In such an embodiment, the mounting structures (e.g., 40) can comprise bolts, hooks, and/or other fasteners which can interface corresponding portions on the ATV 20. In another embodiment, however, the seat 22 can be hingedly connected to the ATV 20 so that it may be pivoted upwardly to reveal an underlying storage location where the ATV's battery and/or other items are stored. In this circumstance, at least some of the mounting structures (e.g., 40) can be configured to interface a hinge, whereby the hinge can interface the ATV 20, while other mounting structures (e.g., 40) can be configured to provide or interface a latch for selectively securing the seat 22 in at least one of an opened position and a closed position. In still other embodiments, the seat might be alternatively moveable through longitudinal sliding or otherwise.

The base 32 is shown to include a number of vertical and horizontal ribs which can provide structural rigidity to the seat 22. As better shown in FIGS. 4-5, these ribs can include a first vertical rib 43, a second vertical rib 45, a third vertical rib 47, first horizontal ribs 49, and second horizontal ribs 51. In the embodiment of FIGS. 4-5, at least a portion of the first vertical rib 43 forms a first side wall 42, at least a portion of the second vertical rib 45 forms a second side wall 44, and at least a portion of the third vertical rib forms a third side wall 46. Additionally, at least portions of the first horizontal ribs 49 form top walls 48, and at least portions of the second horizontal ribs 51 form bottom walls 50. Together, the first side wall 42, the second side wall 44, the third side wall 46, the top walls 48, and the bottom walls 50 cooperate to define a receptacle having a chamber 34 with an opening 36. A tab 38 can be provided adjacent to the opening 36 and can be moveable between a first position and a second position.

Figure 6:
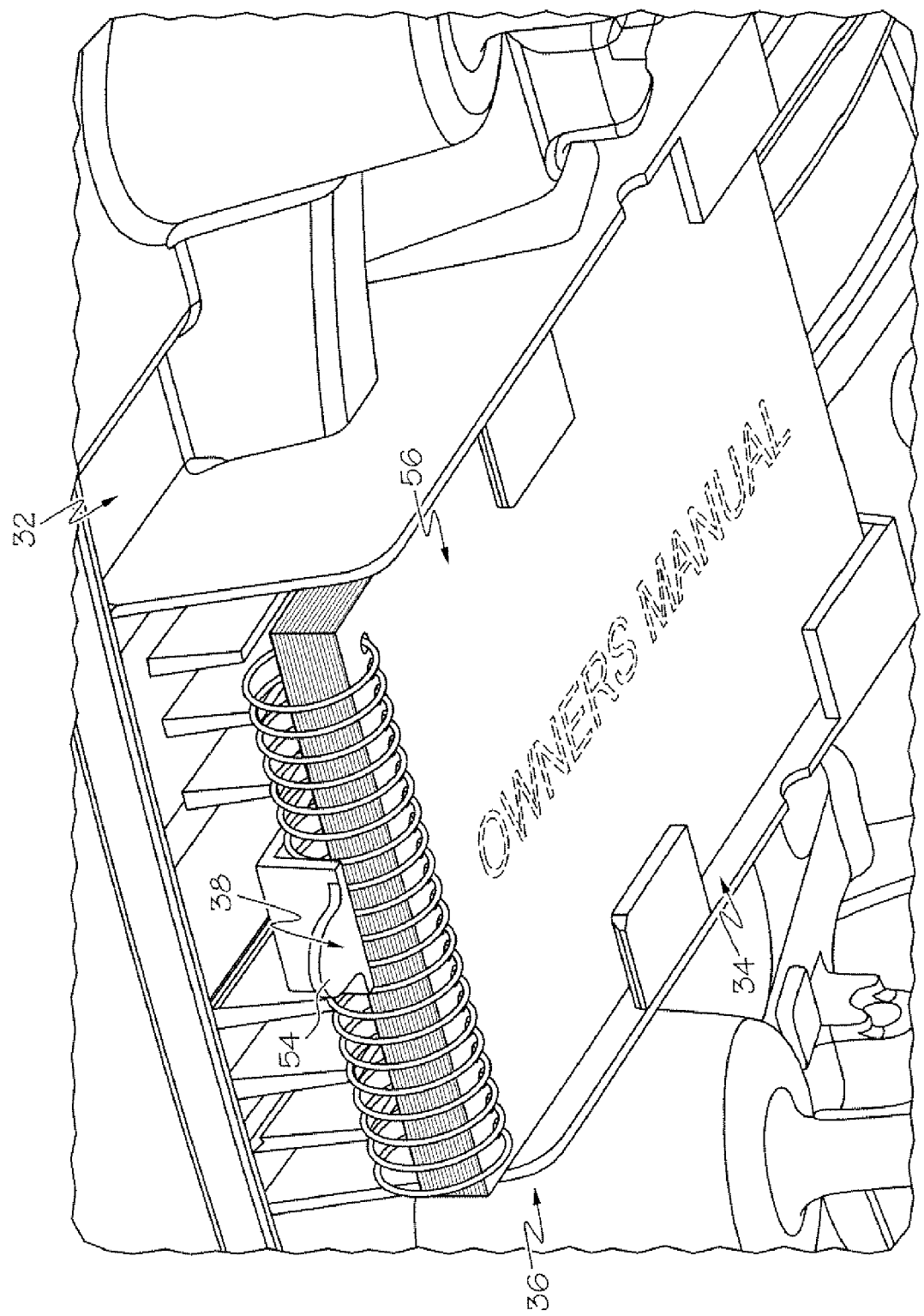
FIG. 6 is an enlarged perspective view depicting the portion of the seat depicted in FIG. 5 in association with a spiral bound owner's manual.

In this specific configuration, the second side wall 44 can be generally parallel with and spaced from the first side wall 42. The third side wall 46 can be generally perpendicular to the first sidewall 42 and the second side wall 44 and can extend at least partially from the first side wall 42 to the second side wall 44. The bottom walls 50 and the top walls 48 can be spaced from each other in a generally parallel arrangement and can extend at least partially from the first side wall 42 to the second side wall 44. For example, the bottom walls 50 provided by the second horizontal ribs 51 are shown in FIG. 5 to extend only partially from each of the first and second side walls 42, 44 toward the other of the first and second side walls 42, 44. In this configuration, as the bottom walls 50 do not extend entirely between the first and second side walls 42, 44, the bottom of the chamber 34 has an open nature whereby a manual within the chamber 34 can be visible (e.g., as shown in FIG. 6) or potentially contacted by an operator from below the chamber 34. In alternative embodiments, one or more of the bottom walls may extend entirely between the first and second side walls 42, 44 which, depending upon the precise configuration of the bottom walls, may or may not facilitate an operator's viewing and/or contacting of a manual within the chamber from below the chamber. In an alternative configuration, one or more bottom walls might extend at least partially from the first side wall 42 to the second side wall 44 without contacting and/or becoming adjacent to either the first or second side walls 42, 44.

The bottom walls 50 and the top walls 48 can also extend at least partially from the third side wall 46 to the tab 38. For example, the bottom walls 50 are shown in FIG. 5 to extend only partially from the third side wall 46 to the tab 38. In this configuration, as the bottom walls 50 do not extend entirely between the third side wall 46 and the tab 38, the bottom of the chamber 34 has an open nature whereby a manual within the chamber 34 can be visible (e.g., as shown in FIG. 6) or potentially contacted by an operator from below the chamber 34. In alternative embodiments, one or more of the bottom walls may extend entirely between the third side wall 46 and the tab 38. It will be appreciated that one or more of the bottom walls might alternatively extend at least partially from the third side wall 46 to the tab 38 without contacting or becoming adjacent to either the third side wall 46 and/or the tab 38. It will also be appreciated that the top walls 48 and the third side wall 46 can similarly be provided to extend in any of a variety of specific configurations. By providing the first side wall 42, the second side wall 44, the third side wall 46, the top walls 48, the bottom walls 50, and the tab 38, the base 32 functions to at least substantially define the chamber 34. It will be appreciated that a base in accordance with the present invention can provide ribs or other structures for supporting an owner's manual in any of a variety of alternative configurations.

Figure 7:
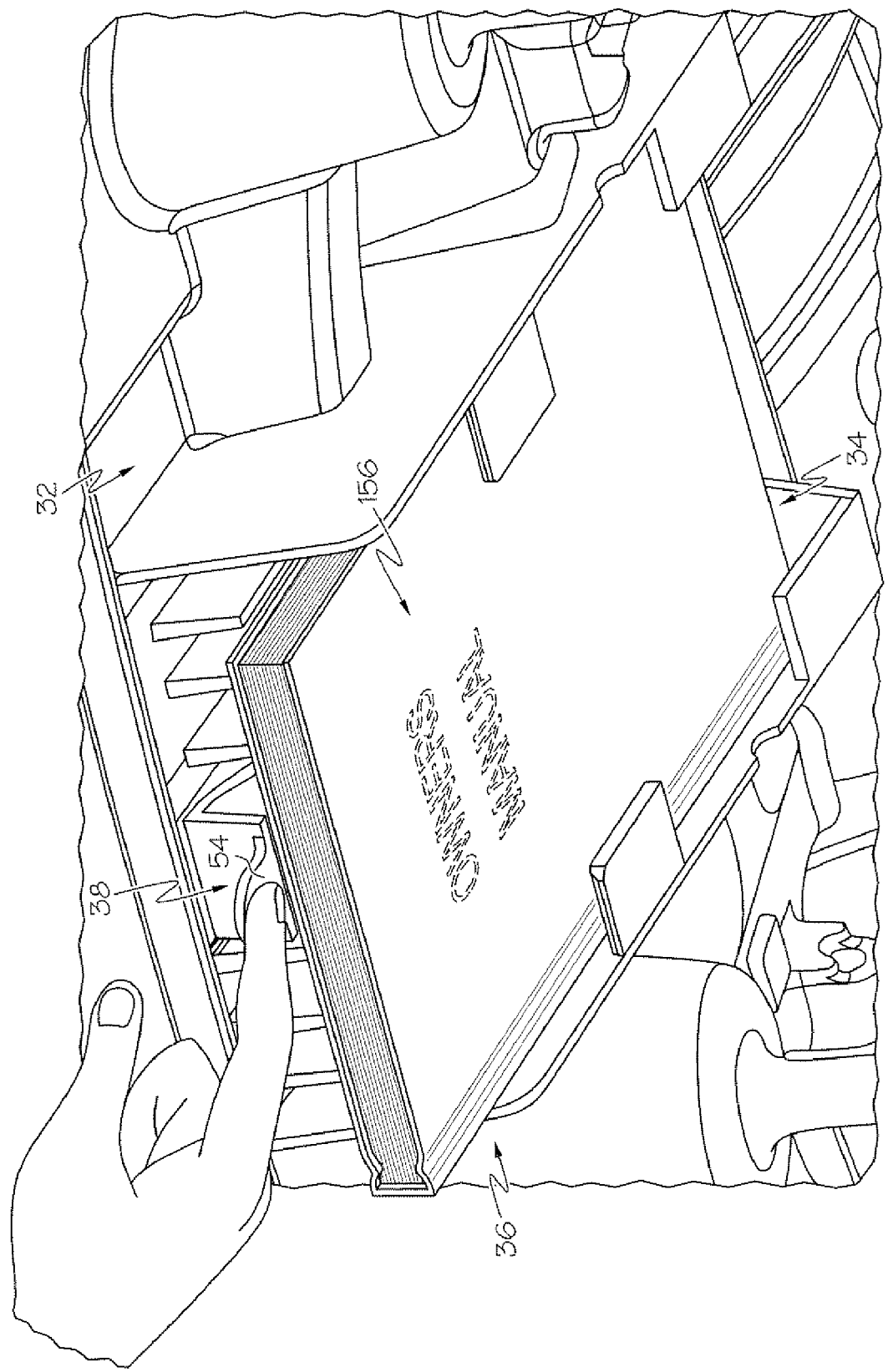
FIG. 7 is an enlarged perspective view depicting the portion of the seat depicted in FIG. 5 in association with a hardcover owner's manual.

The tab 38 is shown to include a finger portion 54 which is configured to receive contact from an operator's finger to facilitate hinged movement of the tab 38 between the first position and the second position. As most clearly depicted in FIG. 5, the tab 38 can be integral with the base 32, and a narrowed portion 52 can be provided along the tab 38 to serve as a living hinge. In other embodiments, the tab can be provided separately from the base but can be attached to the seat, such as to the base. The tab 38 can provide a fourth side wall 58 to further define the chamber 34 when the tab 38 is in the first position and to retain or block an owner's manual within the chamber 34. The tab 38 is shown in the first position in FIGS. 5-6 for example, while the tab 38 is shown in the second position in FIG. 7. As shown in FIGS. 5-7, for example, the tab 38 can move between the first and second positions in a direction substantially perpendicular to the longitudinal orientation of the seat 22. However, it will be appreciated that a tab in accordance with the teachings of the present invention can alternatively be configured to move or swing in any of a variety of alternative directions when moving between the first and second positions, provided that the tab at least partially blocks the opening to the chamber when in one position, but does not substantially block the opening to the chamber when in the other position.

The chamber 34 can be configured to provide a storage location for an owner's manual for the vehicle. For example, FIG. 6 depicts a spiral bound owner's manual 56 being retained within the chamber 34, while FIG. 7 depicts a hardcover owner's manual being partially retained within the chamber 34. In both instances, the owner's manual is maintained securely within the chamber so long as the tab remains in the first position. However, when an operator wishes to remove the owner's manual from the chamber, the operator need only depress the tab into the second position and then manually pull or withdraw the owner's manual from the chamber and through the opening. It will be appreciated that by mere displacement of the tab 38 into the second position, complete access is provided to the contents of the chamber 34. To reinsert the owners manual into the chamber for storage therein, an operator can depress the tab and can then insert the owner's manual through the opening and into the chamber. After the owner's manual has been fully inserted into the chamber, the tab can be released by an operator, and the tab (e.g., its fourth side wall) can serve to prevent the owner's manual from escaping from the chamber through the opening.

In one embodiment, the seat 22 can be configured such that the opening 36 to the chamber 34 is accessible to an operator without movement of the seat 22 in order that the owner's manual can be removed from the chamber 34 by an operator without movement of the seat 22. This configuration can be particularly beneficial for use with seats which are fixed in place (e.g., not hinged or longitudinally slideable). However, in vehicles having a hinged seat, it will be appreciated that it may be necessary to move or rotate the seat upwardly before removing an owner's manual through the opening of a chamber.

The chamber 38 as depicted and described with respect to FIGS. 3-7 is shown to be entirely defined by ribs provided by the base 32 of the seat 22. It will be appreciated that this configuration can, in some circumstances, be cost effective and simple to implement, as it can be achieved through a mere alteration of the molding equipment and manufacturing process for the base 32 of the seat 22. It should also be appreciated that the specific combination of ribs depicted and described with respect to FIGS. 3-7 is merely illustrative and that any number of alternate rib arrangements can be provided in accordance with the teachings of the present invention.

Figure 8:
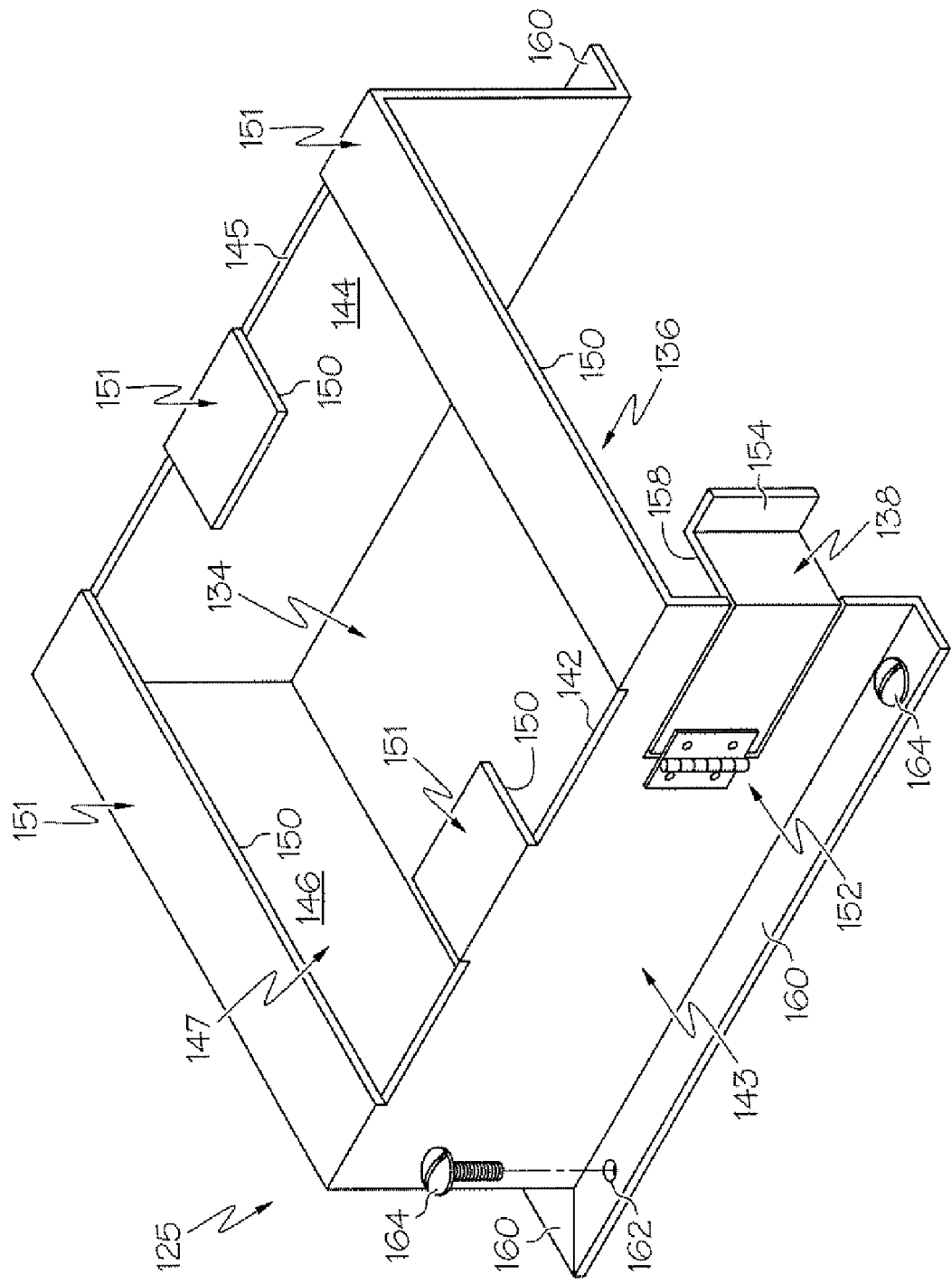
FIG. 8 is a perspective view depicting a frame and a tab in accordance with one embodiment of the present invention.

While a receptacle can be formed integrally with the base of a seat as described above with respect to FIGS. 3-7, a receptacle might alternatively be at least partially provided by one or more components which are separate from a seat but are configured for attachment to the seat and/or another part of a vehicle. For example, as shown in FIG. 8, a frame 125 can be formed from steel, plastic, or some other material to include a first side member 143, a second side member 145, a third side member 147, and one or more horizontal members 151. At least a portion of the first side member 143 is shown to provide a first side wall 142, at least a portion of the second side wall 145 is shown to provide a second side wall 144, and at least a portion of the third side member 147 is shown to provide a third side wall 146. Portions of the horizontal members 151 can provide bottom walls 150. The first side wall 142, the second side wall 144, the third side wall 146, and the bottom walls 150 can together at least partially define a chamber 134, wherein an opening 136 is provided to the chamber 134. In some embodiments, these components of the frame can at least substantially define the chamber. In the embodiment depicted in FIG. 9, the first side wall 143, the second side wall 145, the third side wall 146, and the bottom walls 150 of the frame 125 cooperate with an underside of the seat 122 (e.g., the base 132) to define the chamber 134.

Figure 9:
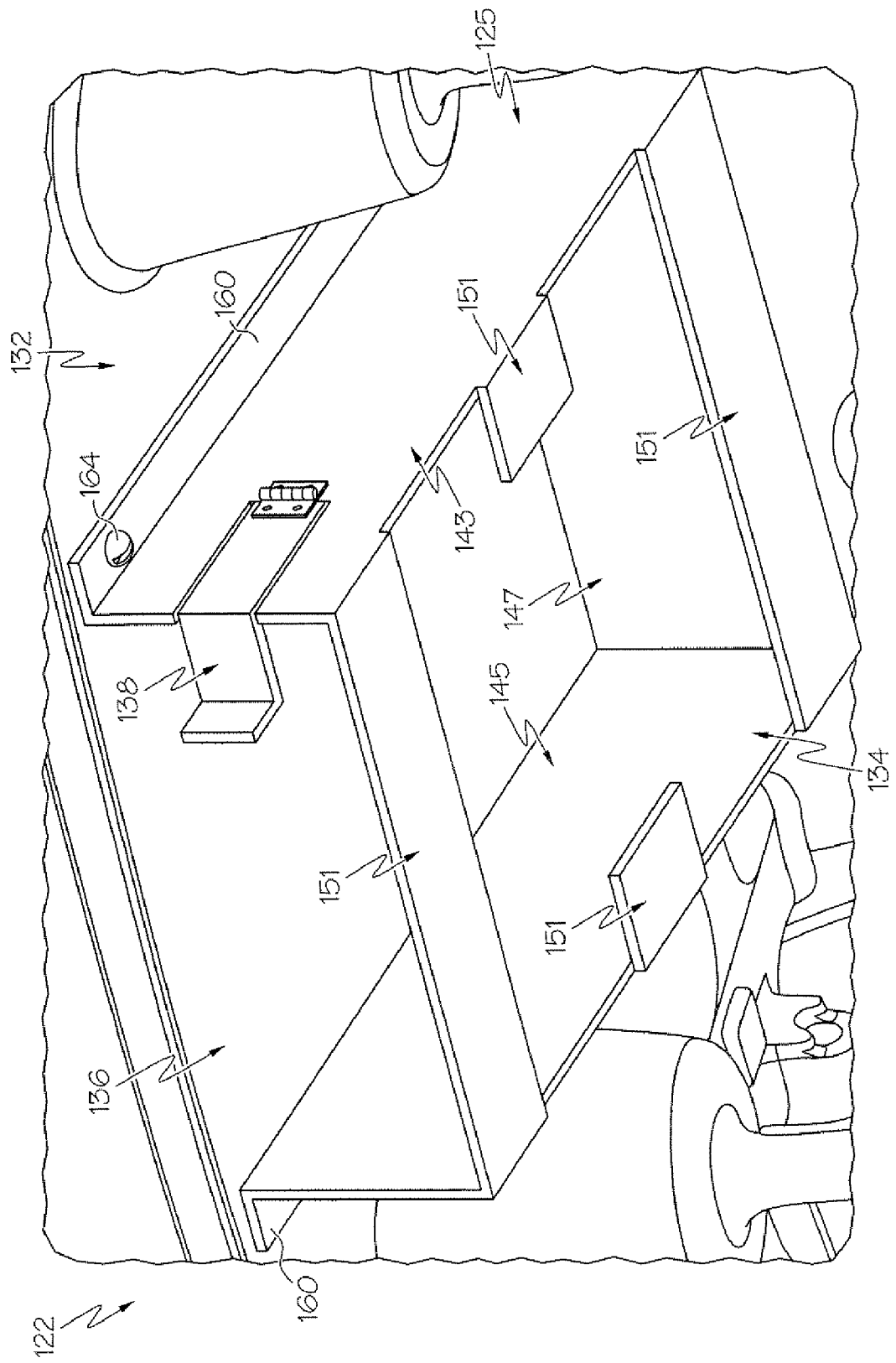
FIG. 9 is a bottom perspective view depicting the frame and tab of FIG. 8 being attached beneath the seat of a vehicle.

With regard to the specific frame 125 depicted in FIGS. 8-9, the second side wall 144 is generally parallel with and spaced from the first side wall 142. The third side wall 146 is generally perpendicular to the first side wall 142 and the second side wall 144 and extends at least partially from the first side wall 142 to the second side wall 144. The bottom walls 150 are generally parallel with and spaced from an underside of the seat 122 (e.g., the base 132) and extend at least partially from the first side wall 142 to the second side wall 144 as well as at least partially from the third side wall 146 to the tab 138. However, it will be appreciated that a frame in accordance with the present invention can be constructed in any of a variety of alternative configurations.

The frame 125 can also include one or more mounting members 160 which can be used to facilitate attachment of the frame 125 to a seat or another portion of a vehicle. In particular, the mounting members 160 can include at least one aperture 162 through which bolts (e.g., 164) can be received. For example as shown in FIG. 9, the frame 125 can be attached to an underside of a base 132 of a seat 122 through use of bolts (e.g., 164) and/or adhesives. In the example depicted in FIG. 9, the base 132 provides a top wall and the frame 125 works in conjunction with the base 132 to define the chamber 134 for storage of an owner's manual. In other embodiments, however, a frame may include sufficient walls to completely define a chamber (e.g., without need for any contribution from a vehicular component such as the base of a seat). It will be furthermore appreciated that a frame in accordance with the teachings of the present invention might not be attached to the seat of a vehicle, but might rather be attached to another part of the vehicle disposed below a vehicle's seat.

A moveable tab can be connected to a frame in any of a variety of alternative configurations. For example, as shown in FIGS. 8-9, a tab 138 can be moveably attached to the first side member 143 of the frame 125 through use of a hinge 152. However, the tab 138 might be alternatively attached to another portion of the frame 125, such as to the second side member 145 and/or a horizontal member 151. The tab 138 is shown to include a finger portion 154 which can receive contact from an operator in moving the tab 138 between a first position and a second position. The tab 138 can also include a fourth side wall 158 which can be configured to further define the chamber 134 when the tab 138 is in its first position. Upon displacement of the tab 138 from the first position to the second position, an owner's manual can be inserted into the chamber 134 through the opening 136. When the tab 138 is returned to its first position, the owner's manual can remain secured within chamber 134 until such time as the tab 138 is again moved to its second position by an operator and the manual is removed from the chamber 134 through the opening 136.

A tab in accordance with the teachings of the present invention can be biased toward its first position so that when the tab is in its second position, and if an operator removes his or her finger from the tab, the tab will return to its first position. In one example, with reference to the tab 38 depicted in FIG. 5, the biasing can be provided by the narrowed portion 52, whereby the tab 38 returns to its first position after being bent to its second position by an operator. In another example, with reference to the tab 138 depicted in FIG. 8, the hinge 152 can include a spring and/or one or more external springs can be provided to bias the tab 138 in its first position. It will be appreciated that a tab in accordance with the present invention can be biased in any of a variety of alternative suitable manners.

As shown in FIG. 10, a seat 222 is depicted in accordance with another embodiment of the present invention. The seat 222 extends from a front end 226 to a rear end 228 and includes an opening 236 in the rear end 228 for providing access to a chamber 234. A tab 238 can be attached to the seat 222 adjacent to the opening 236 and can be moveable between a first position (shown in FIG. 10) and a second position. When in the first position, the tab 238 can serve to retain a manual 256 within the chamber 234. However, when moved to the second position by an operator, the manual 256 can be easily removed from the chamber 234.

Spiral bound and hardcover owner's manuals can provide advantages in durability as compared to other types of owner's manuals (e.g., having a soft cover). However, spiral bound and hardcover owners manuals which are not intended to be bent can accordingly be prone to damage if secured through conventional arrangements involving a rubber band and/or only fixed ribs. Accordingly, a receptacle and/or seat in accordance with the present invention can provide advantages when used with a spiral bound owner's manual and a hardcover owner's manual. For example, such a manual need not be bent for insertion into the receptacle or for removal from the receptacle, and when stored within the receptacle, the manual is not being constantly held under force of a rubber band. However, it will also be appreciated that a receptacle and/or seat in accordance with the teachings of the present invention can accommodate manuals other than owner's manuals such as, for example, soft-cover booklets, pamphlets, maps, documents, folded literature, and stapled literature. In addition, although certain of the foregoing examples indicate storage of an owner's manual upon an ATV, it will be appreciated that a receptacle and/or seat in accordance with the teachings of the present invention can be provided upon any of a variety of alternative vehicles such as, for example, motorcycles, personal watercrafts, scooters, bicycles, and other saddle-type vehicles.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A seat for a vehicle, the seat comprising:
   a cushion;
   a base supporting the cushion and defining a chamber having an opening, wherein the chamber is configured to provide a storage location for a manual and the opening is configured to accommodate passage of a manual to and from the chamber; and
   a tab provided adjacent to the opening, wherein the tab is integral with the base and is moveable between a first position in which the tab blocks a manual from passing through the opening, and a second position in which the tab allows a manual to pass through the opening.

2. The seat of claim 1 wherein the base comprises a top side and an underside, the cushion is disposed adjacent to the top side, and the chamber is at least partially defined by the underside.

3. The seat of claim 1 wherein the base is configured such that the chamber has a partially open bottom and that, when a manual is within the chamber, the manual is visible to an operator of a vehicle from below the chamber.

4. The seat of claim 1 wherein the tab comprises a living hinge and is configured for hinged movement from the first position to the second position.

5. The seat of claim 3 wherein the base comprises a first side wall, a second side wall spaced from the first side wall, and at least one bottom wall, the first side wall, the second side wall and the at least one bottom wall cooperating to partially define the chamber, the at least one bottom wall extending from one of the first side wall and the second side wall partially toward the other of the first side wall and the second side wall.

6. The seat of claim 1 wherein the tab comprises a finger portion configured to receive contact from an operator's finger to facilitate movement of the tab between the first position and the second position.

7. The seat of claim 1 wherein the tab is biased toward the first position.

8. A seat for a vehicle, the seat comprising:
   a cushion;
   a base supporting the cushion and defining a chamber having an opening, wherein the chamber is configured to provide a storage location for a manual and the opening is configured to accommodate passage of a manual to and from the chamber; and
   a tab provided adjacent to the opening, wherein the tab is moveable between a first position in which the tab blocks a manual from passing through the opening, and a second position in which the tab allows a manual to pass through the opening;
   wherein the base comprises a first side wall, a second side wall, a third side wall, a top wall, and a bottom wall which cooperate to define the chamber, and the second side wall is generally parallel with and spaced from the first side wall, the third side wall is generally perpendicular to the first side wall and the second side wall and extends at least partially from the first side wall to the second side wall, and the bottom wall and the top wall are generally parallel with each other and are spaced from each other and each extend at least partially from the first side wall to the second side wall as well as at least partially from the third side wall to the tab.

9. A receptacle configured to facilitate storage of a manual beneath the seat of a vehicle, the receptacle comprising:
   a frame attached to a vehicle, the frame comprising a first side wall, a second side wall, a third side wall and a plurality of bottom walls that at least partially define a chamber having an opening, wherein the chamber is configured to provide a storage location for a manual and the opening is configured to accommodate passage of a manual to and from the chamber; and
   a tab provided adjacent to the opening and moveable between a first position in which the tab blocks a manual from passing through the opening, and a second position in which the tab allows a manual to pass through the opening.

10. A receptacle configured to facilitate storage of a manual beneath the seat of a vehicle, the receptacle comprising:
    a frame attached to a vehicle and at least partially defining a chamber having an opening, wherein the chamber is configured to provide a storage location for a manual and the opening is configured to accommodate passage of a manual to and from the chamber; and
    a tab provided adjacent to the opening and moveable between a first position in which the tab blocks a manual from passing through the opening, and a second position in which the tab allows a manual to sass through the opening; and
    wherein the tab is attached to the frame.

11. The receptacle of claim 9 wherein the tab is configured for hinged movement from the first position to the second position.

12. The receptacle of claim 9 wherein the tab is biased toward the first position and comprises a fourth side wall and a finger portion integral with and extending away from the fourth side wall, the fourth side wall further defining the chamber, the finger portion being configured to receive contact from an operator's finger to facilitate movement of the tab between the first position and the second position.

13. The receptacle of claim 10 wherein the frame is configured for attachment to an underside of a seat.

14. The receptacle of claim 13 wherein the frame comprises a first side wall, a second side wall, a third side wall, and a bottom wall which cooperate with an underside of the seat to define the chamber, the second side wall is generally parallel with and spaced from the first side wall, the third side wall is generally perpendicular to the first side wall and the second side wall and extends at least partially from the first side wall to the second side wall, and the bottom wall is generally parallel with and spaced from an underside of the seat and extends at least partially from the first side wall to the second side wall as well as at least partially from the third side wall to the tab.

15. A vehicle comprising:
- a seat comprising a base and a cushion attached to the base, wherein the seat is configured to support at least one of an operator and a passenger of the vehicle in use of the vehicle;
- a chamber associated with the seat and configured to provide a storage location for a manual, wherein the chamber has an opening configured to accommodate passage of a manual to and from the chamber; and
- a tab, the tab being spaced from the cushion of the seat and adjacent to the opening, wherein the tab is moveable between a first position in which the tab blocks a manual from passing through the opening, and a second position in which the tab allows a manual to pass through the opening.

16. The vehicle of claim 15 wherein the base comprises a top side and an underside, the cushion is disposed adjacent to the top side, and the chamber is provided adjacent to the underside.

17. The vehicle of claim 15 wherein the tab is configured for hinged movement from the first position to the second position.

18. The vehicle of claim 15 wherein the tab is biased toward the first position and comprises a finger portion configured to receive contact from an operator's finger to facilitate movement of the tab between the first position and the second position.

19. The vehicle of claim 15 wherein the base at least substantially defines the chamber.

20. The vehicle of claim 15 further comprising a frame, wherein the frame is attached to the base and at least substantially defines the chamber.

21. The vehicle of claim 15 comprising an all terrain vehicle, wherein the base is configured such that the chamber has a bottom that is partially open.

22. The vehicle of claim 15, wherein:
- the tab further defines the chamber and at least partially blocks the opening when the tab is in the first position.

23. The vehicle of claim 22, wherein:
- the tab comprises a side wall and a finger portion integral with and extending away from the side wall; and
- the side wall further defines the chamber when the tab is in the first position.

* * * * *

UNITED STATES PATENT AND TRADEMARK OFFICE
CERTIFICATE OF CORRECTION

| | |
|---|---|
| PATENT NO. | : 7,665,789 B2 |
| APPLICATION NO. | : 11/776764 |
| DATED | : February 23, 2010 |
| INVENTOR(S) | : Michael Peterson |

It is certified that error appears in the above-identified patent and that said Letters Patent is hereby corrected as shown below:

Background of the Invention, Column 1, line 16, change "all" to --an--;

Detailed Description of Embodiments, Column 3, line 39, change "sidewall" to --side wall--;

Claim 10, Column 8, line 47, change "sass" to --pass--.

Signed and Sealed this

Sixth Day of April, 2010

David J. Kappos
*Director of the United States Patent and Trademark Office*